April 1, 1969  C. M. VAN DER BURGT  3,436,005
WELDING APPARATUS PROVIDED WITH A VIBRATING CONTACT TIP
Filed Feb. 5, 1963
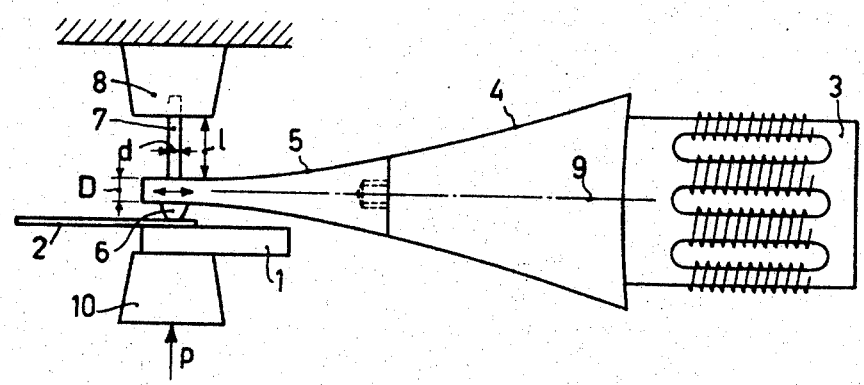
INVENTOR
CORNELIS M. VAN DER BURGT
BY
AGENT

United States Patent Office 3,436,005
Patented Apr. 1, 1969

3,436,005
WELDING APPARATUS PROVIDED WITH A VIBRATING CONTACT TIP
Cornelis Martinus Van Der Burgt, Emmasingel, Eindhoven, Netherlands, assignor to North American Philips Company Inc., New York, N.Y., a corporation of Delaware
Filed Feb. 5, 1963, Ser. No. 256,471
Claims priority, application Netherlands, Feb. 13, 1962, 274,759
Int. Cl. B23k 1/06
U.S. Cl. 228—1      4 Claims The invention relates to a welding apparatus provided with a contact tip which by means of an electromechanical transducer associated with an amplitude transformer is set into mechanical vibration, while the force with which the said tip is pressed on the work piece is absorbed by a supporting member arranged at right angles to said amplitude transformer. Such an apparatus is described, for example, in British Patent 837,869. The vibration ensures that any oxide films which may be present on the workpieces to be welded together are detached, which enables the workpieces to be satisfactorily welded to one another with a comparatively low static pressure.

In the said known apparatus the supporting member takes the form of a comparatively thick metal rod which is rigidly secured to the amplitude transformer and hence has a material influence upon the natural frequency of said amplitude transformer. This gives rise to the disadvantage that the apparatus cannot readily be adapted to varying operating conditions such as, for example, the required static pressure, the frequency of the vibration, the material of the workpieces, and so on. If the amplitude transformer is not rigidly secured to the supporting member so that they may each be exchanged according to operating conditions, the area of contact between the amplitude transformer and the said body in practice is heated to a temperature such as to give rise to damage and even melting or welding together of the supporting member and the amplitude transformer.

It is an object of the present invention to provide an apparatus which offers important advantages. The invention is characterized in that the supporting member freely engages the amplitude transformer and has a thickness smaller than that of the amplitude transformer at the area of contact with the supporting member, while the length of said body corresponds to the natural resonant frequency of the bending oscillation which is substantially equal to the mechanical vibration.

The apparatus according to the invention can readily be disassembled into its various component parts, while in operation only a negligible quantity of vibratory energy is dissipated in the supporting member.

In order that the invention may readily be carried into effect, an embodiment thereof will now be described, by way of example, with reference to the accompanying diagrammatic drawing.

In the drawing the two workpieces to be welded to one another are designated 1 and 2. Either or both of the workpieces may be made of aluminium or another metal of poor weldability; however, metals of better weldability may also be used to advantage. The workpiece 2 preferably has the shape of a thin band or strip. The two workpieces are pressed together with a certain force while they are locally set into a very strong mechanical vibration so that any surface films which interfere with the welding are disrupted.

The mechanical vibration is produced with the aid of an electromechanical transducer, which in the embodiment shown is of piezomagnetic type but may in practice be another device for converting electrical energy into mechanical energy. Its frequency preferably lies in the ultrasonic range. The longitudinal mechanical vibration produced by the transducer 3 is transmitted through an amplitude transformer 4, 5 to contact tip 6 which exerts pressure on the workpiece 2. The force P with which the two workpieces 1 and 2 are pressed together is absorbed by a supporting rod 7 one end of which is clamped in a member 8. The member 8 is rigidly mounted and a member 10 is pressed to the workpiece 1 with the force P. Obviously, the member 8 may be movable and be subjected to the required pressure. The workpieces may be arranged horizontally or vertically, as desired.

The amplitude transformer 4, 5 may be built up from two parts 4 and 5, the length of each part being equal to one half of the effective wavelength. Normally, the parts are of circular cross-section, while the cross-sectional area of the part nearer the electrode 6 is smaller than that of the part which is in direct contact with the transducer 3, with the result that the amplitude with which the contact tip 6 is set in vibration is materially greater than the amplitude at the area of contact between the transducer 3 and the amplitude transformer 4, 5. Alternatively, however, such an amplitude transformer may be made in one piece or in more than two pieces. Usually the surface of such an amplitude transformer is smooth; however, coupled cylinders having different diameters may also be used.

According to the invention the supporting member 7 has a thickness $d$ which is smaller than the thickness D of the amplitude transformer 5 at the area of contact with said member 7 and is, for example, smaller than $\frac{1}{3}$D, while the length $l$ of the supporting member 7 has the value at which the natural resonant frequency (preferably the fundamental wave) of the bending vibration which the member 7 performs about the clamping point 8 is substantially equal to the frequency of the longitudinal vibration produced by the transducer. The thickness $d$ is measured in the direction of the mechanical vibration and the length $l$ in the direction between the point of contact with the amplitude transformer 5 and the clamping member 8. Consequently, the bending vibrations which the body 7 performs about the clamping point 8 are in synchronism with the movements of the amplitude transformer 5 at the area of contact with the body 7, the relative movement and hence the heat generation at the area of contact between the parts 5 and 7 being reduced to a minimum.

By the small thickness $d$ which is made no larger than is necessary to enable the thrust force P between the two workpieces 1 and 2 to be absorbed, and by the correct length $l$ of the supporting member 7 it is ensured that the power required to maintain the member 7 in vibration is very small so that only a negligible amount of power is transferred from the amplitude transformer 5 to the member 7. The member 7 is preferably made of a metal exhibiting little damping for mechanical vibrations, for example, of titanium, nickel-chromium steel or hard brass. Its width (at right angles to the plane of the drawing) is not of importance provided that it is not excessively large. It may be matched to the shape of the end of the amplitude transformer 5 at the area of contact with the member 7 the end of which may alternatively terminate in a rectangle, for example, a square cross-section so that the area of contact between the parts 5 and 7 is increased.

In a practical embodiment in which a mechanical vibration having a frequency of 20 kc./s. was used, an amplitude transformer was employed the thickness D of which was 10 mm. at its end. The steel supporting member 7 had a length $l$ of 10 mm., a thickness $d$ of 2 mm. and a width (at right angles to the plane of the drawing) of 20 mm. Thus it was capable of absorbing a force of several hundreds of kilograms between the workpieces 1 and 2 without becoming even slightly heated in the process.

What is claimed is:
1. A welding apparatus comprising, an electromechanical transducer, an amplitude transformer connected thereto, said electromechanical transducer imparting vibratory movement to said amplitude transformer, first and second spaced members, a support means rigidly mounted on said first member at one end, the other end of said support means freely engaging said amplitude transformer, a contact tip mounted on said amplitude transformer remote from said support means and spaced from said second member to provide a clearance for first and second workpieces to be joined, said support means having a thickness in the direction of movement of said amplitude transformer, at the area of free engagement, substantially less than the thickness of the amplitude transformer in a direction substantially orthogonal to the direction of movement of said amplitude transformer at said area of free engagement, and a length corresponding to a natural resonant frequency of the bending vibration of the support means, said natural resonant frequency being substantially equal to the frequency of the mechanical vibration of said electromechanical transducer and, means for controlling the separation between said first and second members whereby the workpieces may be welded under a preselected pressure.

2. A welding apparatus as set forth in claim 1 in which the interfaces between the support means and the amplitude transformer in the area of free engagement is substantially rectangular.

3. A welding apparatus comprising, an electromechanical transducer, an amplitude transformer connected thereto, said electromechanical transducer imparting vibratory movement to said amplitude transformer, first and second spaced members, a support means rigidly mounted on said first member at one end, the other end of said support means freely engaging said amplitude transformer, a contact tip mounted on said amplitude transformer remote from said support means and spaced from second member to provide a clearance for first and second workpieces to be joined, said support means having a thickness in the direction of movement of said amplitude transformer, at the area of free engagement, not more than one third the thickness of the amplitude transformer in a direction substantially orthogonal to the direction of movement of said amplitude transformer at said area of free engagement and a length corresponding to the fundamental resonant frequency of the bending vibration of the support means, said fundamental resonant frequency being substantially equal to the frequency of the mechanical vibration of said electromechanical transducer and means for controlling the separation between said first and second members whereby the workpieces may be welded under a preselected pressure.

4. A welding apparatus as set forth in claim 3 in which the interfaces between the support means and the amplitude transformer in the area of free engagement is substantially rectangular.

References Cited
UNITED STATES PATENTS

| | | | |
|---|---|---|---|
| 3,056,192 | 10/1962 | Jones | 78—82 |
| 2,946,119 | 7/1960 | Jones | 78—82 |
| 3,052,020 | 9/1962 | Jones | 78—82 |
| 3,038,358 | 6/1962 | Jones | 78—82 |
| 3,039,333 | 6/1962 | Jones | 78—82 |
| 3,038,359 | 6/1962 | Jones | 78—82 |

CHARLES W. LANHAM, *Primary Examiner.*

G. P. CROSBY, *Assistant Examiner.*